(12) United States Patent
Lissandron

(10) Patent No.: US 12,502,034 B2
(45) Date of Patent: Dec. 23, 2025

(54) COMPACT MANUAL COFFEE GRINDER MACHINE, FOR DOMESTIC USE

(71) Applicant: PIETRO GRINDERS SRL, S. Maria di Sala (IT)

(72) Inventor: Luca Lissandron, Vigodarzere (IT)

( * ) Notice: Subject to any disclaimer, the term of this patent is extended or adjusted under 35 U.S.C. 154(b) by 285 days.

(21) Appl. No.: 18/348,082

(22) Filed: Jul. 6, 2023

(65) Prior Publication Data

US 2024/0008685 A1    Jan. 11, 2024

(30) Foreign Application Priority Data

Jul. 6, 2022    (IT) .................. 102022000014251

(51) Int. Cl.
| | |
|---|---|
| *A47J 42/14* | (2006.01) |
| *A47J 42/00* | (2006.01) |
| *A47J 42/12* | (2006.01) |
| *A47J 42/18* | (2006.01) |
| *A47J 42/20* | (2006.01) |
| *A47J 42/38* | (2006.01) |
| *A47J 42/40* | (2006.01) |
| *A47J 42/46* | (2006.01) |
| *A47J 42/50* | (2006.01) |

(52) U.S. Cl.
CPC .............. *A47J 42/14* (2013.01); *A47J 42/18* (2013.01); *A47J 42/40* (2013.01)

(58) Field of Classification Search
CPC .. A47J 42/14; A47J 42/18; A47J 42/40; A47J 42/50; A47J 42/00; A47J 42/12; A47J 42/20; A47J 42/38; A47J 42/46
See application file for complete search history.

(56) References Cited

U.S. PATENT DOCUMENTS

| | | | |
|---|---|---|---|
| 2,671,617 A | 3/1954 | Talge | |
| 2017/0332831 A1 | 11/2017 | Lee | |
| 2018/0279829 A1* | 10/2018 | Kanazawa | .............. A47J 42/46 |
| 2021/0059473 A1 | 3/2021 | Zernhelt et al. | |
| 2021/0282447 A1* | 9/2021 | Abehasera | .............. A47J 42/46 |

FOREIGN PATENT DOCUMENTS

| | | | | |
|---|---|---|---|---|
| CN | 210121084 U | * | 3/2020 | |
| GB | 2187975 A | * | 9/1987 | .............. A47J 42/14 |
| WO | 2021258186 A1 | | 12/2021 | |

OTHER PUBLICATIONS

English translate (CN210121084U), retrieved date May 27, 2025.*

* cited by examiner

*Primary Examiner* — Mohammed S. Alawadi
(74) *Attorney, Agent, or Firm* — Egbert, McDaniel & Swartz, PLLC (57) ABSTRACT

Disclosed is a manual coffee grinder machine for domestic use, of the compact and portable type, having a central body which integrates a hermetically sealed bean reservoir and is joined to a container for the ground powder, which is provided with a quick release clutch with magnets. The grinding unit acts on a horizontal rotation axis, with large-sized flat vertical grinders and an external actuating lever which is located on a side, with respect to the central body, so as to facilitate the introduction of the beans and improve stability during the grinding phase. The lever can be integrated in a retracted way with a snap overturning mechanism. The constructive configuration of the grinder machine optimizes the quality of grinding and the manual actuation, and it also improves the preservation of coffee and offers high efficiency and ease of use.

10 Claims, 9 Drawing Sheets

COMPACT MANUAL COFFEE GRINDER MACHINE, FOR DOMESTIC USE

FIELD OF THE INVENTION

The present invention relates to a compact manual coffee grinder machine, for domestic use.

The innovation finds particular but not exclusive application in the industrial sector of equipment for preparation of coffee; in particular, a manually operated coffee bean grinder machine is proposed, of the portable type.

BACKGROUND OF THE INVENTION

In general, small-sized coffee grinder machines are widely known and used which are actuated manually by means of a rotating actuating lever, also called crank, which from the outside moves the internal means intended to grind whole coffee beans. Grinding takes place directly in the reservoir where the beans are contained or it takes place in a separate grinding chamber, placed below said reservoir, where the beans are introduced from above. A container intended to collect the ground powder is generally integrated below said grinding means, being removable by extraction or release in order to allow easy use. Conventionally, these devices are called manual coffee grinder machines or also crank coffee grinders.

The present invention describes a compact and portable manual grinder machine, with a vertical development configuration, which comprises a container for the beans at the top, a grinding chamber in the centre and a removable container for the ground powder at the bottom, and with advantageously improved functions and ease of use. Indeed, it has been noted that the most used manually operated coffee grinder machines on the market are inexpensive, quite simple to use and are also light and easily transportable; however, they do not offer high quality grinding of the beans and involve a non-negligible actuating effort. Furthermore, they are not suitable for frequent use and do not allow coffee to be preserved adequately inside them. Therefore, a grinder machine is proposed which is provided with an optimized construction configuration in order to significantly improve the grinding and manual actuation, simultaneously solving multiple problems of use, as set out below.

In order to crush the coffee beans, two opposing elements called grinders are provided in the portable grinder machines, which operate in combined action having a corresponding shape and at least one toothed and/or grooved and/or rough surface so as to stop, compress and break the beans introduced together, thus obtaining small-sized fragments in a fine granulated form or in the form of ground powder. To this aim, a first element is thus a rotating grinder, mechanically connected to the external actuating lever by means of a rotation shaft, while a second element is a counter-grinder or fixed grinder, joined to the body of the grinder machine. These grinders are reciprocally spaced with a hollow space where said beans are introduced by gravity, or forced through a channel provided with a thrust feed screw or worm.

From an operational point of view, the aforementioned grinding takes place with the actuation of a mechanism connected to the aforementioned grinders, where the users must rotate the external actuating lever with one hand, while with the other hand they must block the grinder machine as it is not fixed to a stable element, such as a table, as happened in ancient times in wooden grinder machines with a box-shaped drawer. Nowadays, said method of use with both hands is by now applied in all modern devices present on the market, these ones being compact and portable to be easily transported and stored; conversely, where steady domestic use is envisaged electric motor grinder machines are preferred, as they are more comfortable and efficient.

It is also known that a coarse or imprecise grinding of the beans generates ground powder having excessive or non-uniform grain sizes, which leads to a non-optimal extraction of the coffee into the cup, the result of which being not constant and sometimes not very pleasant. Such a lack of precision, for example, is unsuitable in the case of special coffees which have a high origin or processing quality. It has thus been noted that the quality of grinding, in a manually operated device, varies from model to model as it depends on multiple factors, such as for example: the type of said grinders, the shape and position of the actuating lever, the rotation mechanism, the structural configuration, the internal movement of beans and of ground powder. In particular, it has been seen that the result obtained in grinding is primarily related to the shape and arrangement of the grinders, and to the connected actuating mechanism, as also occurs in electric grinder machines.

Indeed, in electric grinder machines every construction detail of the entire grinding system is given particular attention, large-sized calibrated grinders being arranged in a dedicated compartment, in combination with means for limiting friction and misalignments. On the other hand, in manually operated grinder machines, as they are small-sized and inexpensive devices, a lower quality of grinding is conventionally tolerated, by integrating simplified and small-sized grinding means. In particular, since no motor is working, an automatic and constant rotation is not ensured, or a frequency such as to ensure a high centrifugal force to the grinders; it indeed achieves adequate fluidity in the internal movement of the ground powder, automatically emptying said compartment and freeing the interstices. All this considered, it has been seen that in manual grinder machines the grinding is not optimal, also with problems regarding the continuity of introduction of the beans between the grinders and their release from the already ground powder.

Recently, however, there has been a demand for higher operating quality on the market of manual devices. In particular, it is now desirable to actuate the lever more easily and progressively, without friction or obstacles in rotation, and also to have greater precision of grinding or greater homogeneity in the grain sizes of the powder obtained. These demands are due to the growing number of coffee enthusiasts and the progressive diffusion of high quality coffee, with high organoleptic qualities; furthermore, they are also due to the fact that the aforementioned manual grinder machines are nowadays considered objects of design, having a higher construction quality compared to the past. The manual grinder machine which is the subject-matter of the present invention intends to satisfy these requests as well.

STATE OF THE ART

In order to determine the state of the art relating to the proposed solution, a conventional verification has been carried out in patent literature by examining public archives, which has led to the identification of some prior art, including:

D1 WO2021258186A1 (Weimer)
D2 US2021059473A1 (Helen of Troy)
D3 US2017332831A1 (Lee)
D4 U.S. Pat. No. 2,671,617A (Talge)

D1 and D2 describe a manually operated coffee grinder machine, of the portable type, having a longitudinal tube-like development and a vertical arrangement, where the grinding chamber and the grinding unit are arranged longitudinally on the vertical axis comprising a circular and revolving top cover; the actuating lever is fixed on the outer edge of the cover to jointly rotate on the horizontal plane, above the grinder machine. They are internally connected to a vertical rotation shaft acting on conical-type grinders, reciprocally spaced to obtain ground powder having a predetermined grain size, which falls by gravity into a container placed below. The actuating lever is foldable and can rotate into a first closed position, returning within the perimeter of the cover for a more compact and easily transportable configuration, and into a second open position for actuation purposes; in particular, in D1 this rotation takes place by overturning on a horizontal axis, while in D2 it takes place by rotation on the same plane as the one of the cover, being hinged on a vertical axis.

D3 proposes a portable grinder machine apparatus of the combined type, comprising a lower bean container with a grinding unit inside it, together with an upper beverage container which acts as a cup and cover. The apparatus has a longitudinal development with a vertical arrangement; the grinding unit has a vertical rotation shaft and has the actuating lever which is foldable with rotation or slidingly extractable, of adjustable length, which is hidden under the upper container when not in use.

D4 describes a vertically arranged portable coffee grinder machine with a transversely arranged grinding unit, having a horizontal rotation axis with the actuating lever connected on a side to be manually operated with rotation of the lever arm on the vertical plane. The rotation shaft is inside a horizontal channel for the introduction of the beans, integrating a worm-like feed screw which pushes the beans sideways towards conical grinders. The feeding inside the grinding chamber is then forced with a horizontal flow to introduce the coffee into the hollow space between the internal conical grinder which is rotating, and the opposing external conical surface, which is fixed; the ground powder falls into the compartment placed below being pushed by the incoming beans. The lever is a large-sized reel to facilitate actuation, with an interposed threaded ring nut which regulates the grain size by spacing the grinders, or it controls the hollow space. The grinding unit has a locking system.

Drawbacks

The opinion can be reasonably shared that, in general, the known solutions of manually operated coffee grinder machines for domestic use, of the portable type, are comfortable and light but have little fluid actuation, with friction and jerks, and perform an inaccurate grinding, resulting in a poor quality product; moreover, they are sometimes noisy and unwieldy.

More in detail, a first disadvantage which characterizes the known and conventional solutions, such as for example D1-D4, concerns the fact that they assemble conical grinders and that these are small-sized. These grinders do not allow to grind the beans manually in an optimal way, sometimes encountering problems of poor uniformity in the coffee powder obtained, sometimes leading to variable grain sizes.

A second disadvantage consists in the irregularity of rotation of the grinders due to the vertical rotation axis and the awkward arrangement of the actuating lever, where it is located in the upper part as occurs in D1-D3. Such a configuration involves a difficult introduction of the beans inside the hollow space between the conical grinders, this taking place by vertical fall. As a result, a considerable effort is sometimes required on the part of the operator to start and/or to continue grinding after an interruption; moreover, this effort must be resisted with one hand in order to block the device.

The most advanced solutions in order to improve grinding, such as D4, facilitate the actuation by means of a large-sized lever which is assembled on a side, on a horizontal axis, so as to favour the thrust in the manual rotation gesture. However, when conventionally assembling conical grinders, in D4 a forced movement system of the beans is necessary so as to transfer them by pushing them laterally into the hollow space between the grinders, through a horizontal transfer channel which is internally provided with a large-sized thrust feed screw, directly connected to the actuating lever. Such a system thus improves actuation ergonomics but includes a horizontal channel and additional transfer means which increase costs and construction complexity, also favouring the deposit of crushed beans or ground powder between the interstices, with possible friction and irregularities of rotation.

A third disadvantage concerns the actuating lever which is sometimes foldable or overturnable to facilitate the transportability and storage of the device. It has been noted that in known solutions, such as in D1-D3, said lever is small-sized and is assembled on a vertical rotation axis, with the effect of making it not very easy to use in the case of high efforts or prolonged use. Furthermore, in the known solutions the lever does not fold laterally in a retracted way and has no means for retaining in position. In particular, there are no known portable devices with grinding on a horizontal axis where said lever is large-sized in order to facilitate the actuation and can be overturned with a snap mechanism, in the open or closed position, integrating laterally when closed.

A fourth disadvantage concerns the grain size adjustment, which is absent or not very precise in conventional solutions, or it is difficult to perform.

Furthermore, with regard to the disadvantages set out above, it has been seen that in manual grinder machines of the portable type having a vertically elongated configuration, with the bean reservoir in the upper part, the rotation shaft is vertical as in D1-D3, or it is horizontal as in D4. In the first case, the actuating lever is assembled on the top, above the reservoir, on a vertical axis; in the second case, the lever is assembled on a side, on the side of the grinder machine, on a horizontal axis. For practical purposes, it has been seen that the convenience of actuation of the lever and the effect obtained in grinding are mainly linked to two factors combined with each other: the type of grinders used, in this case conical grinders being disadvantageous, and the arrangement of the rotation axis, a horizontal axis being more advantageous.

More in technical detail, there are two different types of grinders suitable for coffee grinder machines: conical grinders or flat grinders. It has been seen that portable grinder machines conventionally assemble conical grinders; the rotating grinder is thus connected to the actuating lever and has a smaller size compared to the opposing fixed grinder, which has a corresponding and hollow shape to house it. Where they are assembled on a vertical axis, as for example in D1-D3, the beans contained in the upper part are channeled and introduced together by gravity; where the conical grinders are assembled on a horizontal axis, as in D4, a worm is instead needed to force the beans inside a channel, pushing them sideways.

Alternatively, it has been seen that some electric devices of the professional type assemble flat grinders, consisting of two circular and flat elements arranged parallel, like two opposed discs having at least one toothed or grooved surface. In this case, as the motor is integrated into the base of the device, grinding generally takes place on a vertical axis with grinders which are superimposed horizontally one on the other; the high centrifugal force ensured by the motor allows the hollow space to be emptied, with the exit of the powder on the horizontal plane.

Furthermore, it has been seen that the shape of said grinders also significantly affects the final quality of the ground product and of the coffee extracted into the cup, or the perception of the taste and/or aroma of the drink, since it determines the degree of uniformity and homogeneity of ground powder and also the degree of preservation of this powder. In particular, for the purposes of the invention, it has been seen that said flat grinders ensure a greater degree of precision and repeatability, with respect to said conical grinders referred to for example in D1-D4, their reciprocal positioning being also easier and with less maintenance.

Particularly for these purposes, it has been indeed seen that two flat grinders operate on parallel planes and do not have the problem of maintaining an absolute concentricity in rotation as conversely occurs between opposing and spaced three-dimensional elements, such as two conical grinders. In this case, the hollow space obtained by the reciprocal spacing can vary by rotation if they are not perfectly concentric, due to excessive tolerances in the assembly phase or due to any misalignments of the rotation axis due to wear or actuation vibrations. Basically, it is very difficult to keep two conical grinders perfectly concentric, especially when one of them is integral with an off-centre rotation shaft, or when the shaft is centred but has a great length, or when it is operated by hand in place of an electric motor as indeed occurs in manual coffee grinder machines actuated by a lever-arm.

It has thus been seen experimentally that in a manually operated coffee grinder machine two flat grinders ensure a more uniform, homogeneous and repeatable powder grinding, compared to the conventional conical grinders referred to for example in D1-D4, thus offering greater grain size precision. Indeed, between two flat grinders it is necessary to maintain only perfect parallelism, and perfect concentricity is not necessary. The use of flat grinders thus appears advantageous in order to solve the known disadvantages of conventional solutions; however, it has been noted that in order to be effective, for the purposes of the invention, these grinders must have a large diameter and must be actuated in a fluid and continuous way. Therefore, there is the technical problem of integrating them adequately into a modern manual grinder machine of the compact and portable type, with a vertical arrangement, with the bean reservoir placed at the top.

Basically, a portable grinder machine is not known and is desirable which assembles grinding means intended to optimize the grinding and ensure a uniform grain size even after prolonged use, with a technical effect analogous to an electric grinder machine for professional use. To this aim flat grinders are thus proposed instead of the conventional conical grinders, particularly configured as described. At the same time, it is desirable for such a grinder machine to significantly facilitate the manual actuation of the lever and also to favour the internal movement of coffee, or to improve the introduction and emptying of the hollow space between the grinders, compared to the abovementioned known solutions.

Furthermore, in manual grinder machines of known type, the problem has also been noted of the last ground coffee residues, which often remain between the grinders and in the interspaces. Indeed, the grinders expel the powder by gravity or thanks to the thrust of the coffee introduced subsequently, and by the centrifugal rotation force which is very limited in manually operated devices, or by agitation of the entire grinder machine. This last operation, however, is awkward and also not recommended to avoid the spreading of ground powder.

Another widespread problem concerns the deterioration of the coffee left inside a manual grinder machine. Indeed, both the whole beans and the ground powder contained in the internal reservoirs, and also the aforementioned residues, rapidly oxidize and degrade, altering the quality of the subsequently ground coffee. Furthermore, if left for a prolonged period in unfavourable conditions, it may happen that they give rise to mould or bacteria and thus contaminate the freshly ground coffee, with hygiene and health problems. Therefore, it is believed that a modern manual coffee grinder machine must also solve the aforementioned problem of residues and preservation, favouring the expulsion of the ground product from the grinders and from the internal mechanisms of the device, and it must also slow down the natural oxidation processes as much as possible, avoiding contamination. Consequently, it is necessary to improve the preservation of the coffee contained in the grinder machine with a hermetic closure.

A last disadvantage concerns the hooking and closing system of the container for ground powder, which is generally not very easy and sometimes not very safe as it is without restraint.

In the light of the above, the need is reasonable for companies in the sector to identify innovative solutions which are capable of overcoming at least the problems reported above.

BRIEF SUMMARY OF THE INVENTION

These and other aims are achieved with the present innovation according to the characteristics of the appended claims, solving the problems described by means of a manual coffee grinder machine (10) for domestic use, of the compact and portable type, consisting of a central body (100) which integrates a hermetically sealed bean reservoir (101, 103) and is joined to a container (110) for ground powder, which is provided with a quick release clutch with magnets. The grinding unit (138) acts on a horizontal axis of rotation, with large-sized flat vertical grinders (130a, 130b) and an external actuating lever (115) which is located on a side, with respect to the central body, so as to facilitate the introduction of the beans and improve stability during the grinding phase; the lever can be integrated in a retracted way with a snap overturning mechanism. The constructive configuration of the invention optimizes the quality of the grinding and the manual actuation, and it also improves the preservation of the coffee and offers high efficiency and ease of use.

Aims

In this way, through the considerable creative contribution the effect of which constitutes immediate and not negligible technical progress, different important aims are achieved.

A first aim was to optimize the grinding in a portable device, realizing a compact and light grinder machine able to grind the beans with precision and quality of processing which are analogous to a table grinder machine with electric motor. The invention allows to obtain ground powder with uniform grain size, which can be adjusted according to need, to improve the result when extracting the coffee into the cup.

A second aim was to optimize the actuating system, or the assembly of internal grinding mechanisms joined to the external lever which actuates the rotation with manual force, so as to make it easier to actuate and also more effective for grinding purposes. In particular, the intention is to create a silent and rapid grinder machine, which realizes a fluid and uniform grinding, with less friction and less effort on the part of the user. Contextually, the aim is to improve the bean feeding flow inside the grinding chamber, to facilitate the entry of the beans into the hollow space between the grinders, and also to facilitate the exit of the ground powder.

A third aim was to improve the handling of the portable grinder machine and its ease of use; in particular, the taking of the ground powder from the lower container is made extremely easy, significantly improving the coupling system with integrated means which facilitate insertion and make it safer. Furthermore, the transportability is improved of the grinder machine, which has reduced weight and small size, with a compact and integrated shape where the lever can be folded in a retracted way despite being of considerable size and connected on a side, to facilitate the actuation. Furthermore, the assembly and disassembly of the grinding means are facilitated, also for cleaning and maintenance purposes.

A fourth aim was to improve the preservation of the coffee inside the portable grinder machine, so as to prolong its duration or by delaying the natural oxidation and natural deterioration of its organoleptic qualities. Furthermore, it is possible to safely transport the coffee inside said grinder machine, preventing the content from accidentally exiting.

A further aim, linked to the previous one, was to create a safer grinding chamber from a hygienic point of view, where the whole beans and the ground powder fall by gravity assisted synergistically by an integrated removal means, limiting the risk of deposits between the grinders and between the interstices.

Another aim of the invention was to provide a portable grinder machine being inexpensive to produce industrially, with a particular constructive configuration which allows to simultaneously achieve multiple aims and advantages, with a synergistic effect. Furthermore, a manual grinder machine configured in this way has a compact, modern and pleasant appearance.

These and other advantages will appear from the subsequent detailed description of some preferential embodiments with the help of the enclosed schematic drawings, whose execution details are not intended to be limitative but only examples.

BRIEF DESCRIPTION OF THE SEVERAL VIEWS OF THE DRAWINGS

FIGS. 7a and 7b represent the grinder machine in a centreline vertical section, with the actuating lever in the open and closed positions, respectively. In FIG. 7a the section is full, according to the Y-Y section plane of FIG. 4d; in FIG. 7b the section is limited to a box comprising said closed lever, according to the section plane X-X of FIG. 3d.

DETAILED DESCRIPTION OF THE INVENTION

Figure 1A:
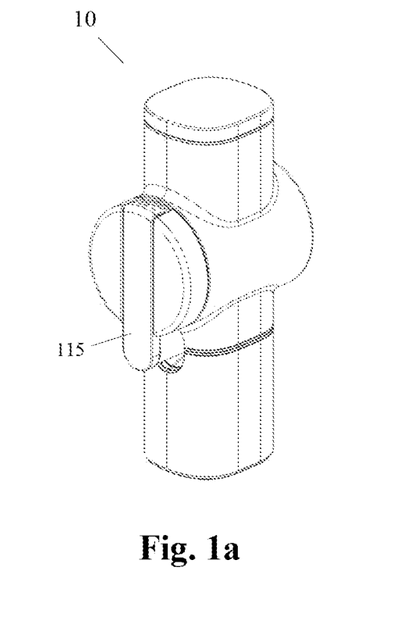
FIGS. 1a and 1b are three-dimensional ensemble views of the portable coffee grinder machine proposed by the present invention, with a lateral actuating lever on a horizontal rotation axis; the grinder machine is represented with said lever placed in the foreground, in the closed position (FIG. 1a) and in the open position (FIG. 1b).
Figure 1B:
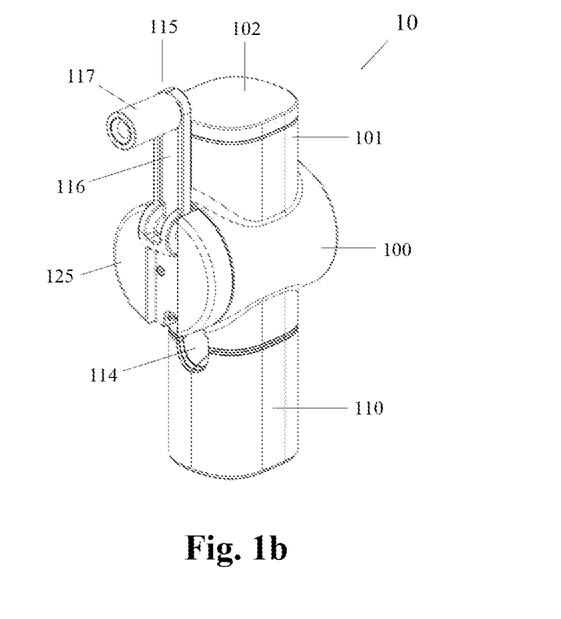
Figure 2A:
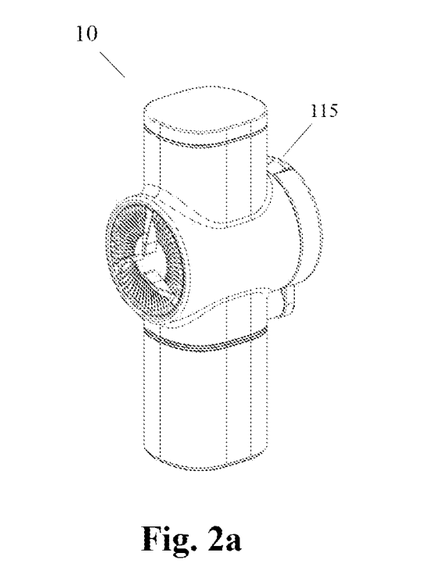
FIGS. 2a and 2b are three-dimensional ensemble views opposite to the previous ones, where the grain size adjustment ring nut is placed in the foreground while said actuating lever is on the back, respectively in the closed (FIG. 2a) and open (FIG. 2b) position.
Figure 2B:
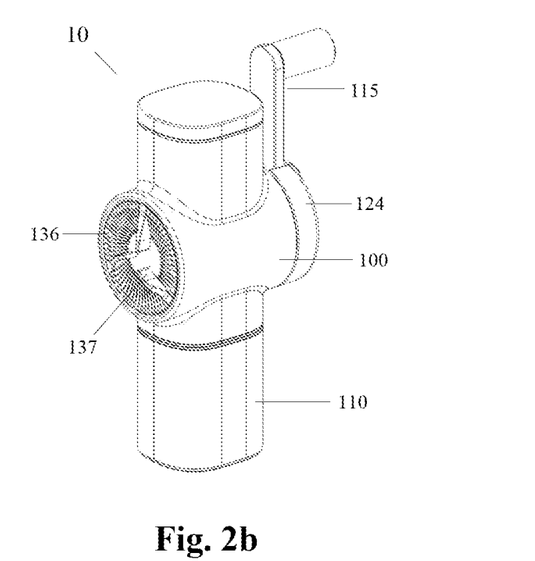
Figure 3A:
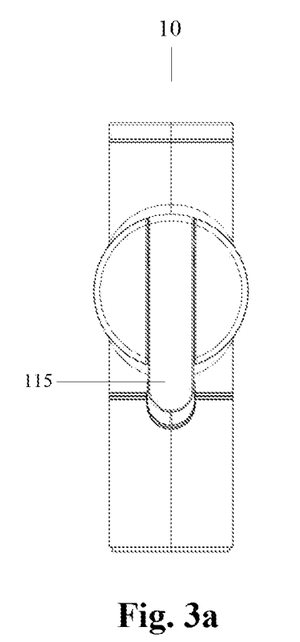
FIGS. 3a, 3b, 3c and 3d are orthogonal views of said grinder machine, with the actuating lever in the closed position or overturned for integration purposes. Respectively, these views are: from the right (FIG. 3a), front (FIG. 3b), from the left (FIG. 3c) and from above (FIG. 3d), where the section plane X-X is also represented; it is noted that such a denomination of the views is conventionally derived from an actuation of the lever with the right hand.
Figure 3B:
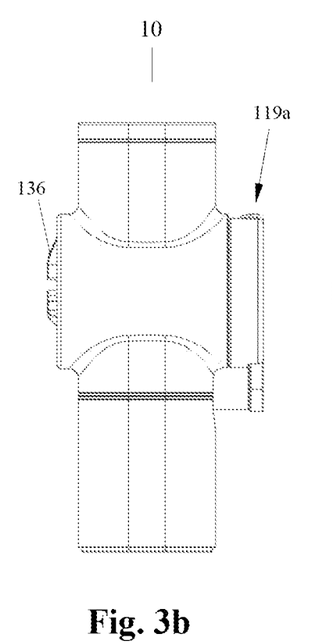
Figure 3C:
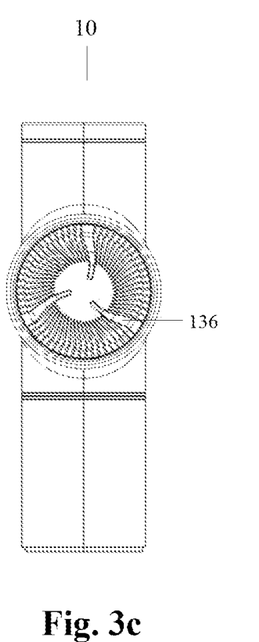
Figure 3D:
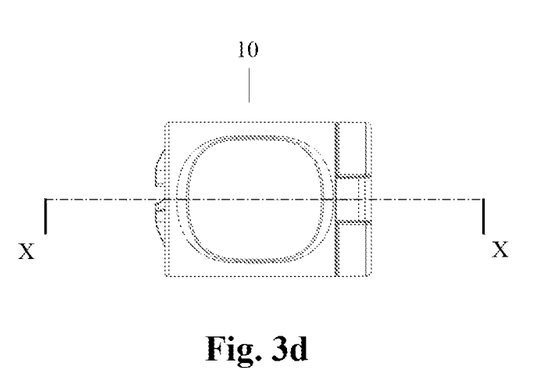
Figure 4A:
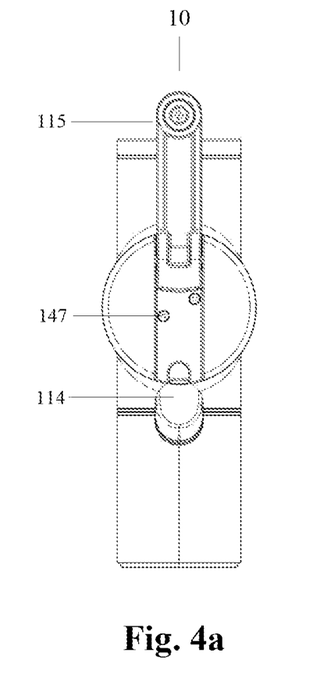
FIGS. 4a, 4b, 4c and 4d are the same orthogonal views as above, with said actuating lever in the open position or lifted for use; in the top view (FIG. 4d) the Y-Y section plane is represented.
Figure 4B:
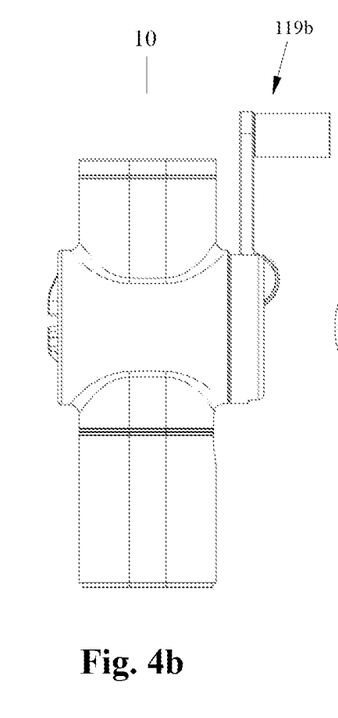
Figure 4C:
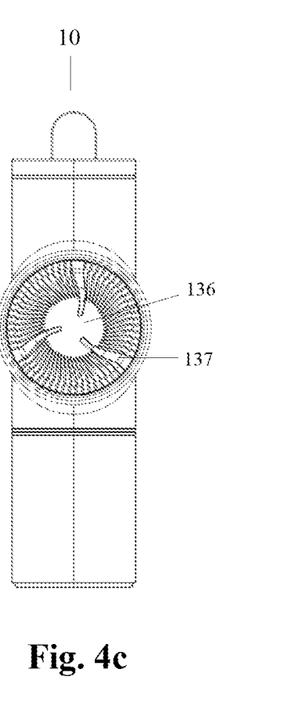
Figure 4D:
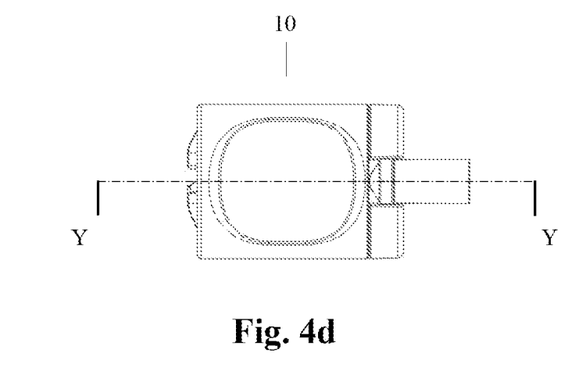

Referring transversally integrates a particular grinding unit (138) which operates on a horizontal rotation axis (139), with flat grinders (130a, 130b) arranged parallel on vertical planes; an actuating lever (115) is connected to one end of the grinding unit, being located externally on a side with respect to the grinder machine (10, 100), so as to facilitate thrust, stability and ergonomics during the grinding phase (FIGS. 1a, 1b).

Figures 8A, 8B:
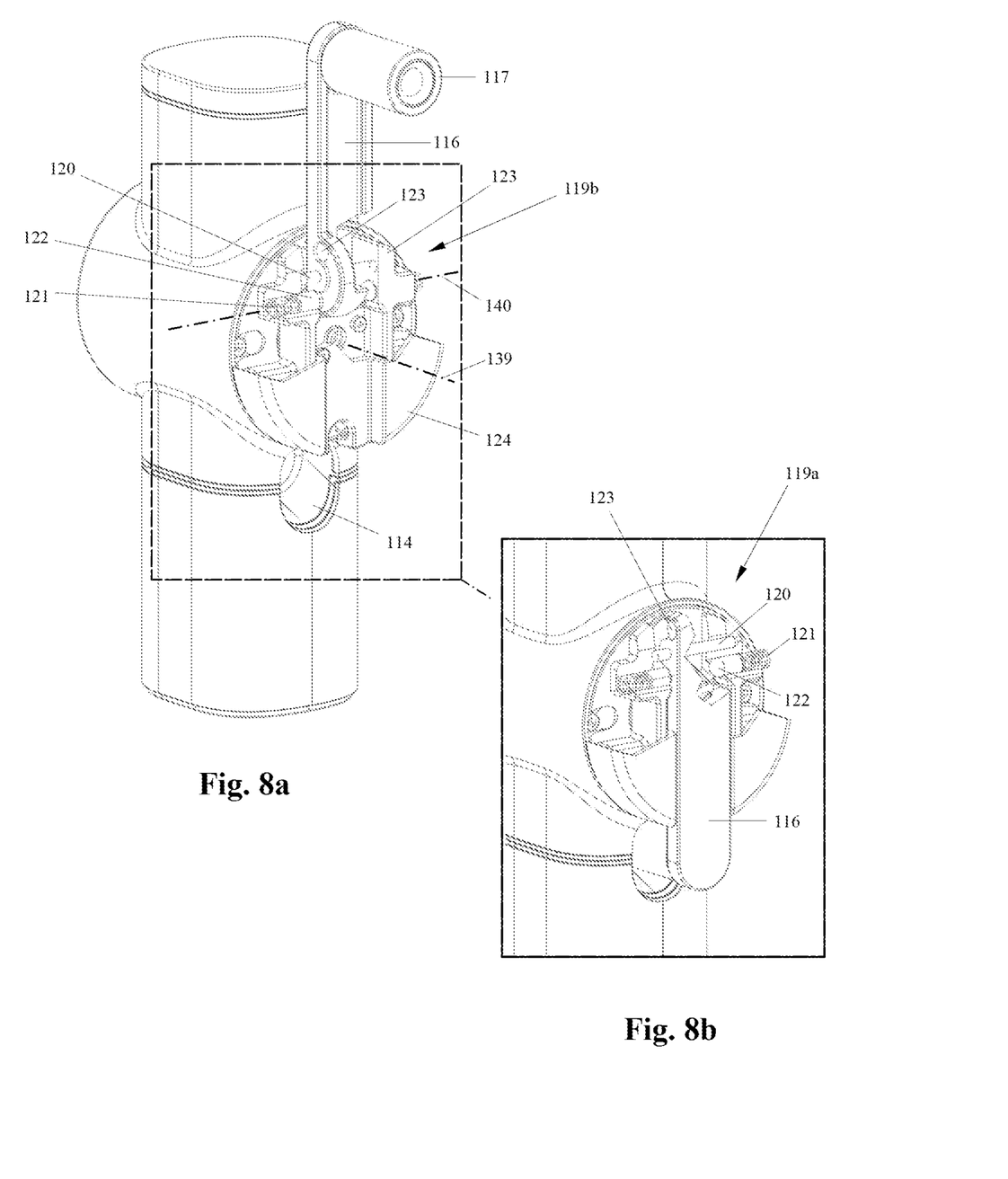
FIGS. 8a and 8b are three-dimensional views of the grinder machine, respectively with the actuating lever which is open (FIG. 8a) and closed (FIG. 8b), where the shaped closure element which externally integrates the lever arm is partially sectioned to make the internal snap overturning mechanism visible.

Said lever (115) can be overturned in a retracted way, integrating into the side of the grinder machine (10, 100) when it is closed or when it is completely lowered for storage, so as to facilitate transportability and storage and to give the grinder machine a pleasant appearance (FIG. 1a, 2a, 3a-3d). In order to quickly position the lever (115) in the two positions of use, that is completely lifted for actuation or completely lowered for closure, a snap lock system is provided which acts on notches (FIGS. 8a, 8b).

Figure 6:
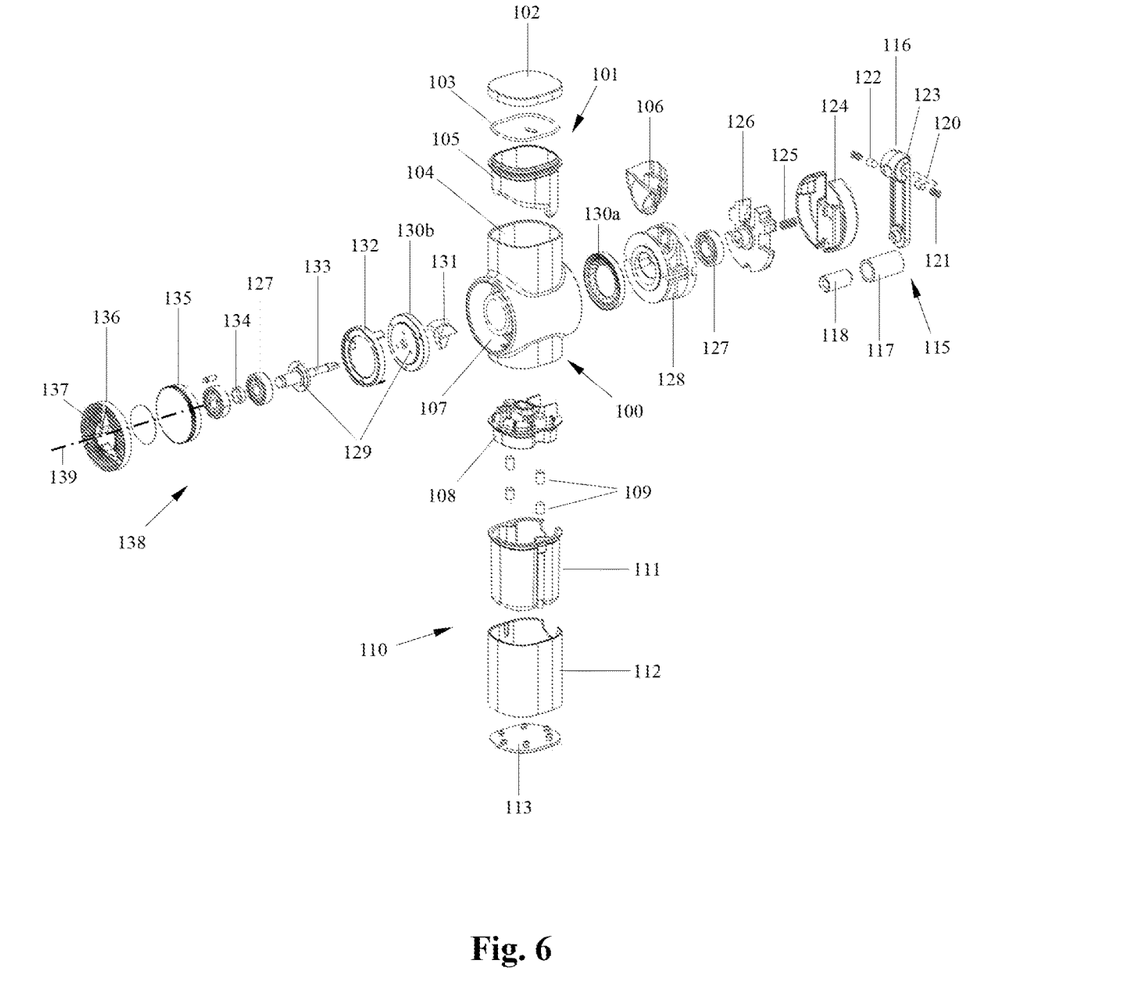
FIG. 6 is an axonometric exploded view of the grinder machine; the components of the grinding unit are exploded horizontally along the rotation axis, with the actuating lever closed.
Figures 7A, 7B:
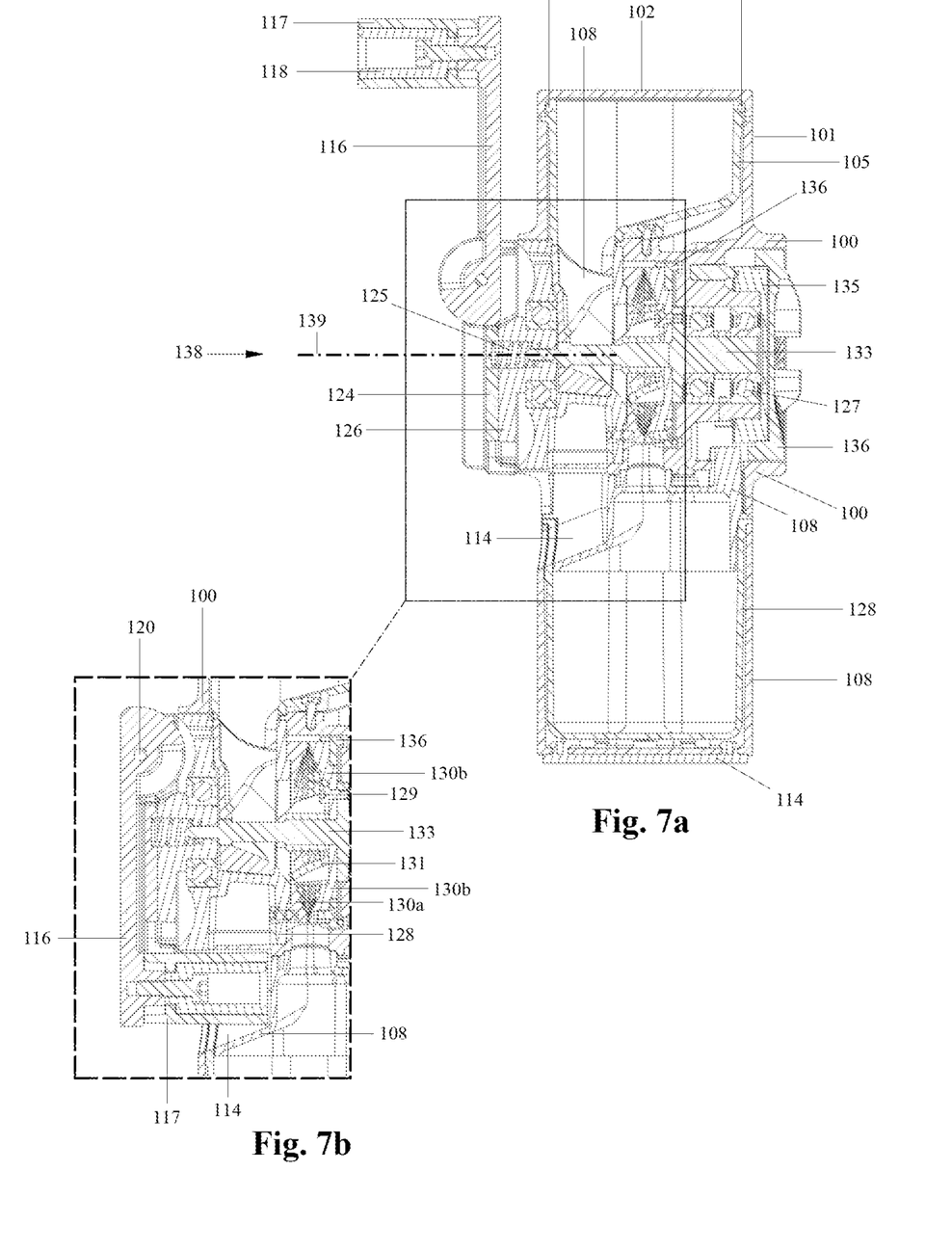

The proposed manual grinder machine (10) is compact (FIGS. 3a-3d, 4a-4d) and advantageously assembles flat grinders (130a, 130b, 138) having large size or with a diameter between 56 mm and 60 mm, arranged vertically, so as to optimize the grinding by acting like the best table devices for domestic or professional use, which are more bulky, heavy and expensive. In the preferred constructional configuration, flat grinders with a diameter of approximately 58 mm are provided, configured as equal and symmetrically opposed discs, provided with a knurled internal surface (FIGS. 6, 7a, 7b).

Figure 5:
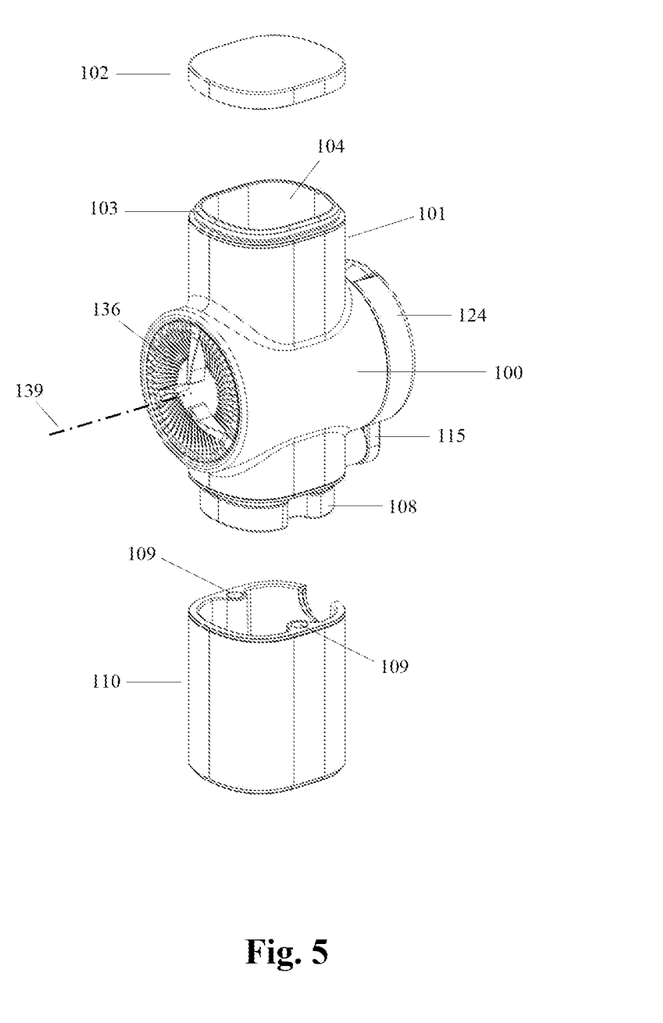
FIG. 5 is a partially exploded three-dimensional view of the grinder machine, as per the ensemble view of FIG. 2a, where the cover is lifted from the bean container to make the gasket visible, and where the container of ground powder is separated from the central body to make the quick release clutch with magnets visible.

In practice, the use of the manual grinder machine (10) is made easier and intuitive, as the device can be disassembled into few elements (FIG. 5). The removal of the cover (102) gives access to the reservoir (101) where the coffee beans are introduced; once the opening (104) is closed, there is a continuous gasket (103) which is assembled around it and interacts with the cover (102), ensuring a hermetic closure to the whole device. In this way, neither the coffee beans in the reservoir nor the ground powder underneath lose their organoleptic characteristics and they are preserved for a long time.

Grinding takes place after lifting the actuating lever (115), causing it to overturn to the vertical position where it locks autonomously by means of the aforementioned snap lock system, which is made with thrust springs and sliding pins acting on notches in the arm (116-123), in a predetermined position. Then, by turning the lever (115) clockwise, the movable grinding means of the aforementioned grinding unit (138) are set in motion; the lever (115) moves a rotation shaft (133) with the rotating grinder (130b) and also puts in rotation the small removal propeller piece (131) which is integrated between the grinders and the inlet conveyor (106) so as to induce the descent of the coffee beans and their uniform distribution in the hollow space between the two grinders (130a, 130b).

The ground coffee powder falls by gravity into the container (110) placed below, through an intermediate element which acts as an outlet conveyor (108), closure of the bottom (100, 107) and housing for the clutch. Once the grinding is finished, the container (110) can be easily released to use the ground coffee; to this aim, said container (110) is provided with a quick release clutch with magnets. More in detail, from the bottom of the central body (100) said outlet conveyor (108) emerges, which is shaped in such a way as to protrude and engage into the upper edge of said container (110) as a guide for insertion, which (110) is counter-shaped and comprises coupling planes where couples of opposing magnets (109) are integrated, one magnet on each side (108, 110). They (109) hold the container in a guided coupling position and allow it to be separated with manual effort (FIGS. 5, 6).

The adjusting of the grain size is easy and precise; it can be performed manually by rotating the external covering cap (136) which is joined to the internal ring nut (135) and is provided with flaps (137) for actuation; they (135, 136) are assembled on the opposite side with respect to the actuating lever (115) to act on the same horizontal axis of rotation (139), like one end of the grinding unit (138). More in operational detail, the element which actuates said adjustment is the internal ring nut (135) which is threaded, so as to act directly on the rotation shaft (130b, 132, 133) by reciprocally spacing the grinders, with a total adjustment rotation equal to 360 degrees.

A manual coffee grinder machine (10) is thus proposed, for domestic use of the compact and portable type, with vertical development, structurally consisting of:
- a central body (100) comprising a grinding chamber (107) and a reservoir (101) for whole beans, with an inlet opening (104) which faces upwards and is provided with a continuous gasket (103), to create a hermetic closure;
- a closing cover (102, 104) which interacts with the continuous gasket (103) for the purposes of said hermetic closure;
- a container for ground powder (110) which is joined under said central body (100, 108) and can be separated from it, being provided with a quick release clutch with magnets (109);
- an external actuating lever (115) of the crank type, with a lever arm (116) provided with a revolving handle (117), which is assembled laterally, that is on the side of the grinder machine (10), in correspondence with the main body (100), which acts on a horizontal rotation axis (139) and can be overturned with snap lock;
- a grinding unit (138) comprising said flat grinders (130a, 130b) which is connected to said actuating lever (115) and acts on the same horizontal rotation axis (139), and which is transversely integrated into the grinding chamber (107) crossing said central body (100) from side to side;
- a rotating ring nut (135, 136) which spaces the grinders from each other, adjusting the grain size of the ground powder.

Said grinding unit (138) comprises multiple grinding means (115-137), some of them fixed and others rotating, which interact with each other in the manner of an optimized grinding system, according to the purposes of the invention (FIGS. 6, 7a, 7b). It comprises a first fixed grinder (130a), integral with the flange (128), and a second rotating grinder (130b) connected to the actuating lever (115) by means of a horizontal rotation shaft (133); the fixed grinder (130a) and the rotating grinder (130b) are flat and vertical like two opposed and reciprocally spaced discs, with the vertical hollow space. It is noted that said shaft, the grinders, the lever, the grain size adjustment ring nut, like the grinding unit, are coaxial being assembled on the same horizontal rotation axis (139).

More in technical detail (FIGS. 6, 7a, 7b), said fixed grinder (130a) is assembled on a flange (128) with an inlet conveyor (106), which introduces the beans between the grinders (130a, 130b) by fall from above, directly from said reservoir (101) placed above, with the help of a removal propeller piece (131), like a small-sized feed screw, which is connected to said shaft (133) and is located between said conveyor (106) and the grinders (130a, 130b) in such a way that, by rotation, it removes the beans by pushing them and distributing them into the hollow space between the grinders (130a, 130b). From here the ground powder is introduced by fall into the container (110) placed below, directly from the hollow space through the outlet conveyor (108) described above, also assisted by the rotation of the rotating means which are integrated into the grinding chamber (107, 130b, 131, 132).

The grinding unit (138) comprises the following components, which operate as a grinding mechanism: the actuating lever (115, 116) which is provided with a handle which is revolving on a pin (117, 118) and with an overturning mechanism with snap lock in closed and open position (119-123), a shaped closure element (124) which internally integrates, or houses, the overturning mechanism and externally integrates, or houses, the arm lever in an open housing; this element engages and covers an anchoring plate (126) of the lever (115) and of the shaft (133), with a counterthrust spring (125) axially located (139). The flange (128) for assembling the fixed grinder (130a) and which also conveys the beans which fall from above, through the inlet conveyor (106), is engaged on said plate and located centrally with respect to the grinding chamber.

In said flange (128) the small removal propeller piece (131) is integrated, which is rotating, connected to the shaft (133) and inserted between the grinders (130a, 130b) and the conveyor (106) to facilitate the fall of the beans, these being pushed and distributed between them. On the opposite side of said chamber (107) a grinder-holder element (132) is inserted which assists in the removal of the ground powder; it is rotating as it is integral with the rotating grinder (130b) which is fixed to the rotation shaft (133), with ball bearings (127), a spacer ring (134) and said threaded adjustment ring nut (135). The ring nut (135) is externally coupled to a covering and actuating cap (136), which is provided with protruding fins (137) to facilitate rotation.

More in technical detail, the actuating lever (115) can be overturned in a retracted way (FIGS. 6, 7a, 7b) by rotation of the lever arm (116) on a pin (120), and integrates snap retaining means, particularly in an open or lifted position (119a) and a closed (119b) or lowered position, in the manner of a facilitated lock. Preferably, these retaining means consist of thrust springs and sliding pins (121, 122) which slide horizontally to engage from the outside on notches (123) integrated on the sides of the lever arm (116) (FIGS. 8a, 8b). Notches corresponding to the open position and to said closed position of the lever arm (116) are provided, for execution of a rotation on said pin (120) equal to 180°.

Advantageously, according to the invention in the closed position (119b) said lever is completely lowered, or it closes, integrating in a retracted way onto one side of the grinder machine (10, 100). To this aim, said closure element (124) is shaped in such a way as to cover the fixing means of the lever (115, 120, 126) and also such as to obtain an external housing for housing the arm (116), which is then integrated in its thickness with the lever closed; in addition, a recess (114) is provided on the same side for housing the handle (117), being thus aligned with said housing of the arm (116, 124).

Finally, it has been experimentally noted that the proposed portable grinder machine achieves all the intended purposes; particularly, in practice, it offers great ease of use, it has an easy manual actuation and performs a precise and repeatable grinding of the beans, ensuring a uniform grain size, like the best table devices for domestic or professional use. It has therefore been noted that the provided grinding means and the specific structural configuration favour the introduction of the beans between the grinders and at the same time they favour the expulsion of the ground product towards the container placed below.

At the same time, the proposed solution significantly reduces the problem of retaining residues inside the grinders and in the interspaces, thanks to the type and arrangement of the grinders which are assembled on a horizontal axis; in them the ground powder descends by gravity, assisted by the rotation of the grinder-holder element which facilitates internal removal together with the propeller piece. It was then verified that thanks to the aforementioned reduction of residues, in combination with the hermetic closure of the upper reservoir and the improved clutch system of the lower container, it is possible to limit the natural processes of oxidation and degradation of coffee, and its preservation is significantly increased.

Figure 10:
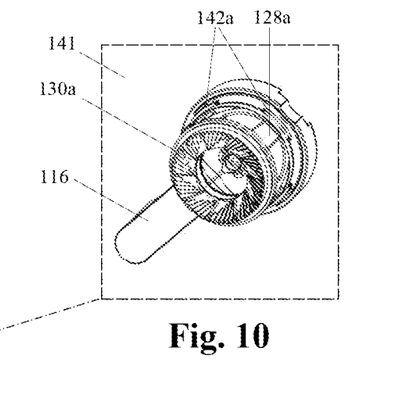
FIG. 10 is a three-dimensional representation of only the extractable unit, of FIG. 9e, seen from the opposite side to highlight the fixed grinder and the hooking small teeth.
Figure 11:
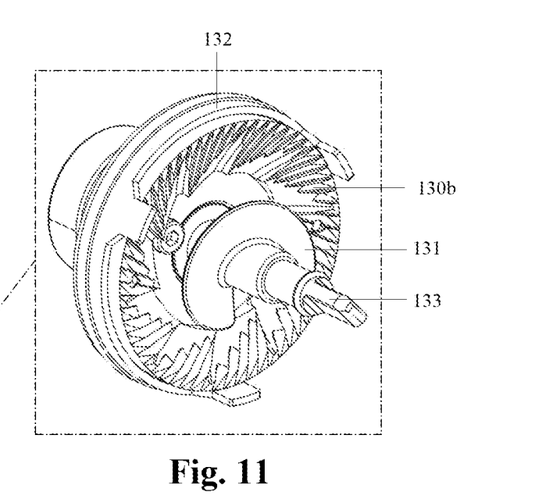
FIG. 11 is an enlarged detail view of the already extracted grinder-holder element of FIG. 9f, to highlight the rotating grinder, the propeller piece and the shaft which acts as a grip for extraction (FIG. 9f).

One improving variant of the invention (10a) (FIGS. 9-11) integrates a quick release and screwless fixing system of the grinding means partially grouped, so as to quickly open the grinding chamber (FIGS. 9a, 9b, 9c, 9d, 9e, 9f) and facilitate the disassembly, the cleaning and the replacement of the grinders and/or of other internal components (146a-146f).

More in detail said variant (10a) simultaneously joins the grinding means close to the lever, which are advantageously grouped and fixed to the central body (100, 107) as a composite element which can be easily removed manually, called extractable unit (141). To this aim, the flange (128a) comprises, on the outer circular edge, quick release coupling means (142a), of the hooking small teeth type for guided engagement and partial rotation, combined with corresponding means on the grinder machine (100, 107, 142b). Therefore, the flange (128a) supports the fixed grinder (130a), the anchoring plate (126), the lever (115) and the closure element (124), assembled as an extractable unit (141) constrained by means of said small teeth (142a, 142b). Basically, there is a quick hooking and releasing clutch with a release button of the so-called bayonet-type, as used in professional photographic lenses.

Figure 9A:
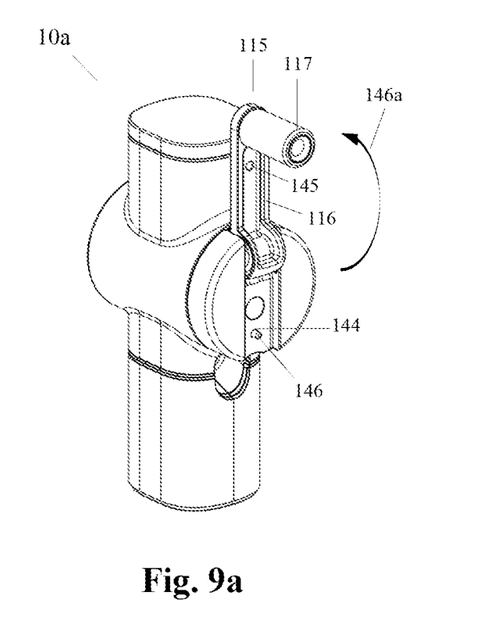
FIGS. 9a, 9b, 9c, 9d, 9e and 9f are three-dimensional ensemble views of one variant of the invention with a quick release system of the grinding means, being represented in an extraction operational sequence where the lever is lifted (FIG. 9a), the extractable unit is rotated by 180 degrees (FIG. 9b), the release pin is pressed (FIG. 9c), the release is rotated by 45 degrees in the opposite direction (FIG. 9d), the extractable unit is extracted (FIG. 9e), and then the internal grinder-holder element is extracted (FIG. 9f).
Figure 9B:
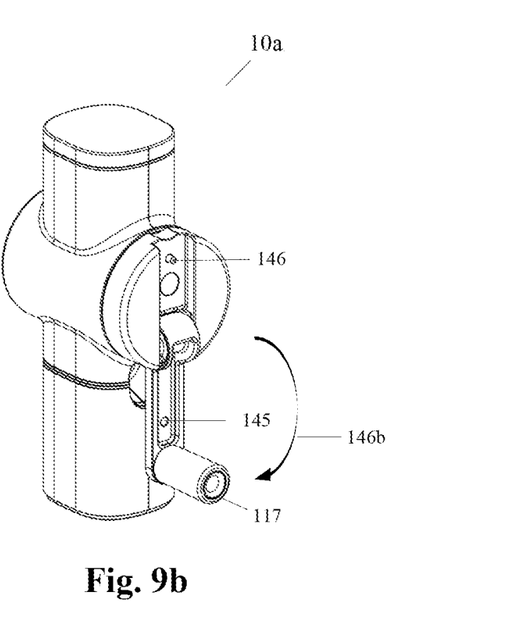
Figure 9C:
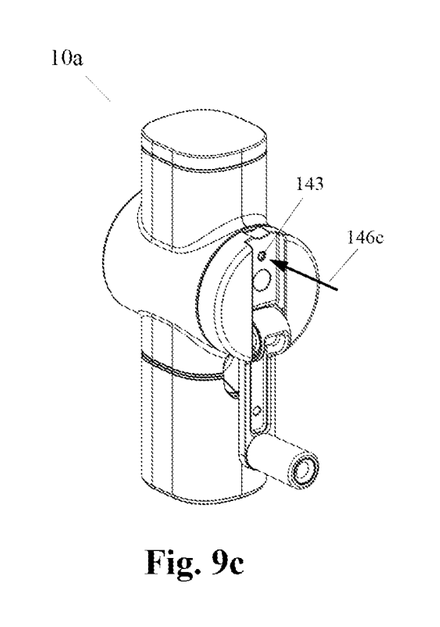
Figure 9D:
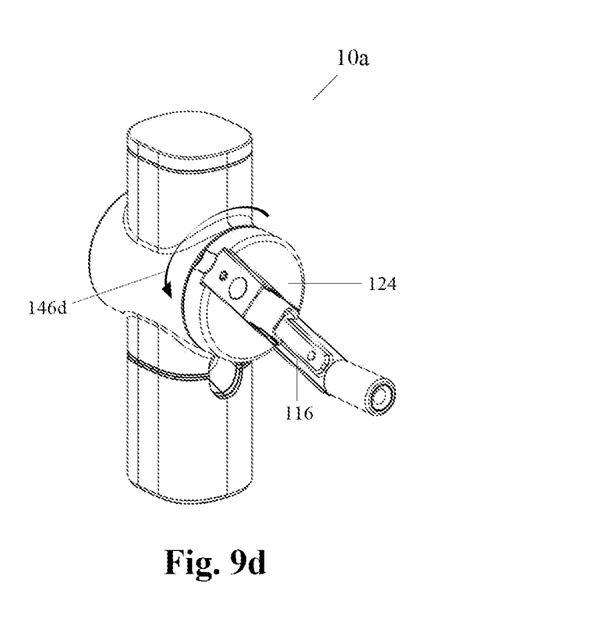
Figure 9E:
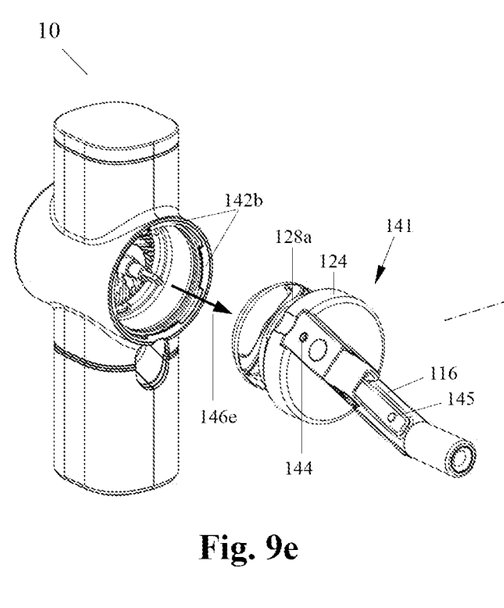

For safety purposes and for precision of engagement, there is a sliding element which acts as a release button; it consists of a pin (143) which exits from the cover (124, 144) under the lever (115, 116, 145) (FIG. 9a) and is inserted into the flange (128a), allowing the extractable unit (141) to perform a 45-degree rotation (FIG. 9d). This rotation is necessary to release the hooking small teeth (142a) which are integrated onto the circular edge of the flange, preferably four small teeth, by the corresponding small teeth (142b) integrated onto the circular edge of entry into the chamber (100, 107).

Figure 9F:
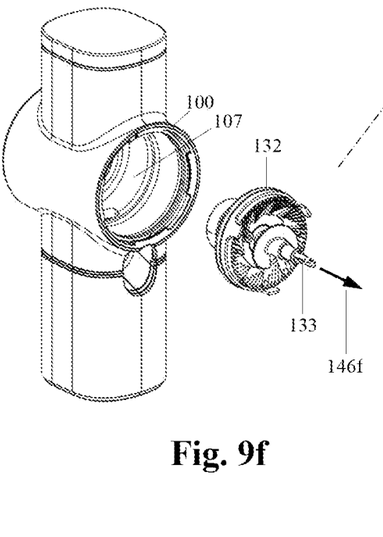

With the aforementioned quick release system, for extraction purposes, the following phases are provided in an operational sequence:
a) lifting the lever (146a) (FIG. 9a);
b) rotating the entire external extractable unit by 180 degrees (141, 146b) to allow release (FIG. 9b);
c) pressing the release pin (143, 146c) (FIG. 9c);
d) rotating by 45 degrees in the opposite direction (146d) to release the small teeth in the extraction direction (FIG. 9d);
e) extracting said extractable unit (141, 146e) along the axis of rotation (139) or horizontally, including the flange and the fixed grinder (128, 130a) (FIGS. 9d, 10);
f) then extracting the grinder-holder element (142, 147f), as an internal unit which includes the rotating grinder (130b), the propeller piece (131) and the shaft (133) which protrudes towards the opening favouring its grip (FIG. 9f).

In one further variant of the invention, which can be integrated into any configuration of proposed grinder machine (10) and is particularly suitable for the aforementioned improved quick-release variant (10b), the effort transmission is optimized with a propeller piece (131) in a deformable material of the resilient elastomeric type, with shape memory; to this aim, a silicone material is suitable for the invention. In particular, the characteristics of this material combined with the tapered structure of the propeller piece like a feed screw are such as to modulate the effort transmitted by the lever (115, 133), imparting always the same force to the rotation. This effect is due to the bending of said propeller piece, which deforms continuously and progressively during grinding, depending on the frequency of rotation of the grinders and on internal friction.

From an operational point of view, with this solution it is possible to obtain greater fluidity and homogeneity of rotation, avoiding the known sudden hardening during manual actuation, or blocking. Indeed, it has been noted experimentally that a manual grinder machine can be actuated by rotating the lever (115) with more or less force and speed, which transmits motion to the rotating grinder (130b). In particular, the effort required is different each time depending on the rotation inertia and/or the environmental conditions and/or the type of coffee and/or the state of wear of the grinding means and/or other concomitant causes. In practice, it is inconvenient to resume grinding when still or when the hollow space between the grinders is clogged with beans and/or ground powder; furthermore, the blocking increases considerably when the rotational speed is very high.

It is therefore desirable, in a manual grinder machine, to have an always fluid and uniform effort to operate the lever during grinding, regardless of the number of revolutions of the grinders, inertia and/or clogging. It has been noted instead that in the case of a propeller piece made of rigid material, the higher the rotation speed, the greater the tendency to flood the grinders with too many beans; this occurs because their dragging inside the hollow space is not directly proportional to the action of the propeller piece, and therefore to the productivity of the system.

To overcome this problem, and always keep the force to be applied to the grinders constant, it is advantageous to introduce said deformable propeller piece in a controlled way, based on the applied effort, with a modular effect. To this aim, it is made of a silicone material which is resistant and progressively deformable as the rotation speed of the grinders and/or the internal obstruction increases, so as not to feed them with an excessive quantity of beans and therefore without hardening during actuation.

NOMENCLATURE (10) manually operated coffee grinder machine apparatus for domestic use of the portable type, called manual grinder machine, with vertical arrangement and lateral actuating lever, according to the present invention. In one variant (10a) it comprises a quick release extractable unit;
(100) central body, with integrated bean reservoir;
(101) integrated hermetically sealed bean reservoir;
(102) reservoir cover;
(103) sealing gasket, for hermetic closure;
(104) bean inlet opening, from above;
(105) internal receptacle of the reservoir;
(106) inlet conveyor;
(107) grinding chamber;
(108) outlet conveyor;
(109) magnet;
(110) ground powder container, of the removable type with quick release;
(111) internal structure of the container;
(112) lateral coating of the container;
(113) bottom of the container;
(114) handle integration recess;
(115) actuating lever of the crank type, rotating on a horizontal axis for the purpose of grinding, conventionally called lever;
(116) lever arm;
(117) revolving handle;
(118) handle pin;
(119a, 119b) lever overturning mechanism, with snap lock, respectively in lever closure and lever opening position;
(120) lever overturning pin;
(121) snap lock spring;
(122) snap lock sliding pin;
(123) notch on rail for snap lock;
(124) shaped closure element, to integrate the overturning mechanism and the lever arm;
(125) shaft counterthrust spring;
(126) shaft and lever anchoring plate;
(127) ball bearing;
(128) fixed grinder assembly flange. In one variant (128a) it is extractable with quick release, with clutch and partial rotation or bayonet, acting as a support for an extractable unit;
(129) fixing screw hole;
(130a, 130b) vertical flat grinders, opposite to each other, being respectively a fixed grinder (130a) joined to the body of the grinder machine by means of a flange, and a rotating grinder (130b) joined to the rotation shaft;
(131) removal propeller piece, helicoidal element in the form of a small feed screw integrated into the flange for removing, pushing and distributing the beans between the grinders. In one variant it is deformable, made of silicone material, to modulate the effort transmitted by the lever;
(132) rotating grinder-holder element;
(133) rotation shaft, corresponding to the rotation axis of the grinders and of the lever;
(134) spacer ring;
(135) threaded grain size adjustment ring nut, which acts on the shaft by making the grinders approach or move away, with a total adjustment rotation equal to 360 degrees;
(136) cap for covering and actuating of the ring nut;
(137) protruding fin;
(138) grinding unit;
(139) axis of rotation for grinding;
(140) axis of rotation for lever overturning;
(141) extractable unit, to the outside;
(142a, 142b) corresponding hooking small teeth, for clutching and partial rotation or of bayonet type, respectively integrated into flange and central body;
(143) sliding pin, as release button;
(144) hole for pin, in the closure element;
(145) hole for pin, in the lever arm;
(146a-146f) direction of movement in the release phases: lifting of the lever (146a), rotation of the extractable unit by 180 degrees (146b), pressure of the release pin (146c), rotation by 45 degrees in the opposite direction (146d), horizontal extraction of the external extractable unit
(146e), horizontal extraction of the internal grinder-holder element (146f) which includes rotating grinder, propeller piece and shaft;
(147) fixing screw.

I claim:
1. A portable vertical manual coffee grinder for domestic use comprising:
a central body having a grinding chamber and a reservoir and an inlet opening, the reservoir adapted to receive coffee beans, the inlet opening facing upwardly and adapted to receive the coffee beans;

a closing cover positioned over the inlet opening;
a container removably joined under said central body, said container adapted to receive ground coffee beans;
an external actuating lever having a lever arm with a rotatable handle, said external actuating lever having a configuration of a crank;
a grinding unit joined to said external actuating lever, said grinding unit integrated into said grinding chamber, said grinding unit having a pair of opposite and reciprocally spaced elements with a hollow space therebetween, said grinding unit adapted to crush the coffee beans in the hollow space, the pair of opposite and reciprocally spaced elements having a first grinder fixed in the grinding chamber and a second grinder that is connected to said external actuating lever by a rotation shaft, wherein the rotation shaft and said external actuating lever and said grinding unit are coaxially rotatable about a common rotation axis;
a rotating ring nut that spaces the first grinder from the second grinder, said rotating ring nut adapted to allow a user to adjust a grain size of the coffee powder, wherein the common rotation axis is horizontal, said grinding unit crossing said central body transversely, said actuating lever being on a side of said central body and connected to one end of said grinding unit, said rotating ring nut being positioned at an opposite side of said central body, wherein the first grinder and the second grinder are opposed discs that are flat and vertical, the hollow space being vertical, wherein the first grinder is mounted on a flange fixed to said central body, the second grinder being connected to a grinder-holder element that is fixed to the rotation shaft and mounted on ball bearings, wherein the flange comprises an inlet conveyor adapted to introduce the coffee beans between the first grinder and the second grinder by gravity directly from the reservoir thereabove, a propeller piece being connected to the rotation shaft below the inlet conveyor, the propeller piece adapted to remove the coffee beans from the reservoir so as to push and distribute the coffee beans into the hollow space, wherein the first grinder and the second grinder grind the coffee beans into the coffee powder and then drop into said container directly below the hollow space with assistance by the grinder-holder element and the propeller piece.

2. The portable vertical manual coffee grinder of claim 1, wherein the reservoir has a hermetic seal with a continuous gasket extending around the inlet opening so as to engage with said closing cover.

3. The portable vertical manual coffee grinder of claim 2, wherein said container has a quick-release clutch with magnets, the quick-release clutch magnetically joined to said central body and manually separable therefrom.

4. The portable vertical manual coffee grinder of claim 2, wherein said external actuating lever is overturnable by rotation of the lever arm on a pin, said external actuating lever being movable between an open position and a closed position, said external actuating lever being raised in the open position, said external actuating lever being lowered in the closed position, said external actuating lever being retractable onto one side of said grinding unit with a closure element so as to at least partially house the lever arm and having a recess that houses the rotatable handle.

5. The portable vertical manual coffee grinder of claim 4, wherein the lever arm rotates 180° on a pin between the open position and the closed position.

6. The portable vertical manual coffee grinder of claim 1, wherein the first grinder and the second grinder each has a diameter of between 56 millimeters and 60 millimeters.

7. The portable vertical manual coffee grinder of claim 1, wherein said rotating ring nut is threaded and is threadedly coupled to said central body.

8. The portable vertical manual coffee grinder of claim 7, wherein said rotating ring nut is externally coupled to a covering and actuating clamp, the covering and actuating clamp having protruding fins.

9. The portable vertical manual coffee grinder of claim 1, wherein the propeller piece is deformable and has shape memory, the propeller piece being formed of a silicone material.

10. The portable vertical manual coffee grinder of claim 1, wherein the flange supports the first grinder and an anchoring plate and the external actuating lever in an extractable unit, the extractable unit being fixed to said central body by a quick-release coupler and a safety block, wherein the quick-release coupler has hooking teeth formed onto a circular edge of the flange and formed onto a circular edge of the grinding chamber, the safety block having a sliding pin that protrudes from said closing cover below said external actuating lever, the sliding pin being insertable into the flange so as to allow the extractable unit to rotate so as to release the hooking teeth.

\* \* \* \* \*